United States Patent [19]

Baumgartner

[11] 4,353,330

[45] Oct. 12, 1982

[54] POCKET BREECHES FOR USE BY A DOMESTIC ANIMAL SUCH AS A DOG

[76] Inventor: Andrée G. Baumgartner, 66, rue de la Barre, 95880 Enghien Les Bains, France

[21] Appl. No.: 178,304

[22] Filed: Aug. 15, 1980

[30] Foreign Application Priority Data

Aug. 21, 1979 [FR] France .................................. 79 21109
Apr. 16, 1980 [FR] France .................................. 80 09478

[51] Int. Cl.³ ............................................. A01K 23/00
[52] U.S. Cl. ...................................................... 119/95
[58] Field of Search ...................... 119/95, 143; 54/79; 128/283

[56] References Cited

U.S. PATENT DOCUMENTS

| | | | | |
|---|---|---|---|---|
| 3,006,343 | 10/1961 | Baxter | ................................. | 128/283 |
| 3,656,459 | 4/1972 | Missud | ................................... | 119/95 |
| 3,786,787 | 1/1974 | Weinberger | ........................... | 119/95 |
| 4,103,645 | 8/1978 | Tyler | ..................................... | 119/95 |

FOREIGN PATENT DOCUMENTS 981247  1/1965  United Kingdom ................ 119/143

*Primary Examiner*—Robert Peshock
*Attorney, Agent, or Firm*—Scully, Soctt, Murphy & Presser

[57] ABSTRACT

These breeches for dogs comprise a back portion followed by a rear part which comes back over the posterior of the animal and presents a circular opening from which extends a pocket into which is introduced a bag, and a belly element connected to the rear part and connected by its free end to the back portion by straps. Fixing elements provided about the opening cooperate with complementary fixing elements mounted on a removable piece provided with an opening. The free edge of the bag is sandwiched between the rear part and the movable piece and is nipped by the fixing elements.

6 Claims, 3 Drawing Figures

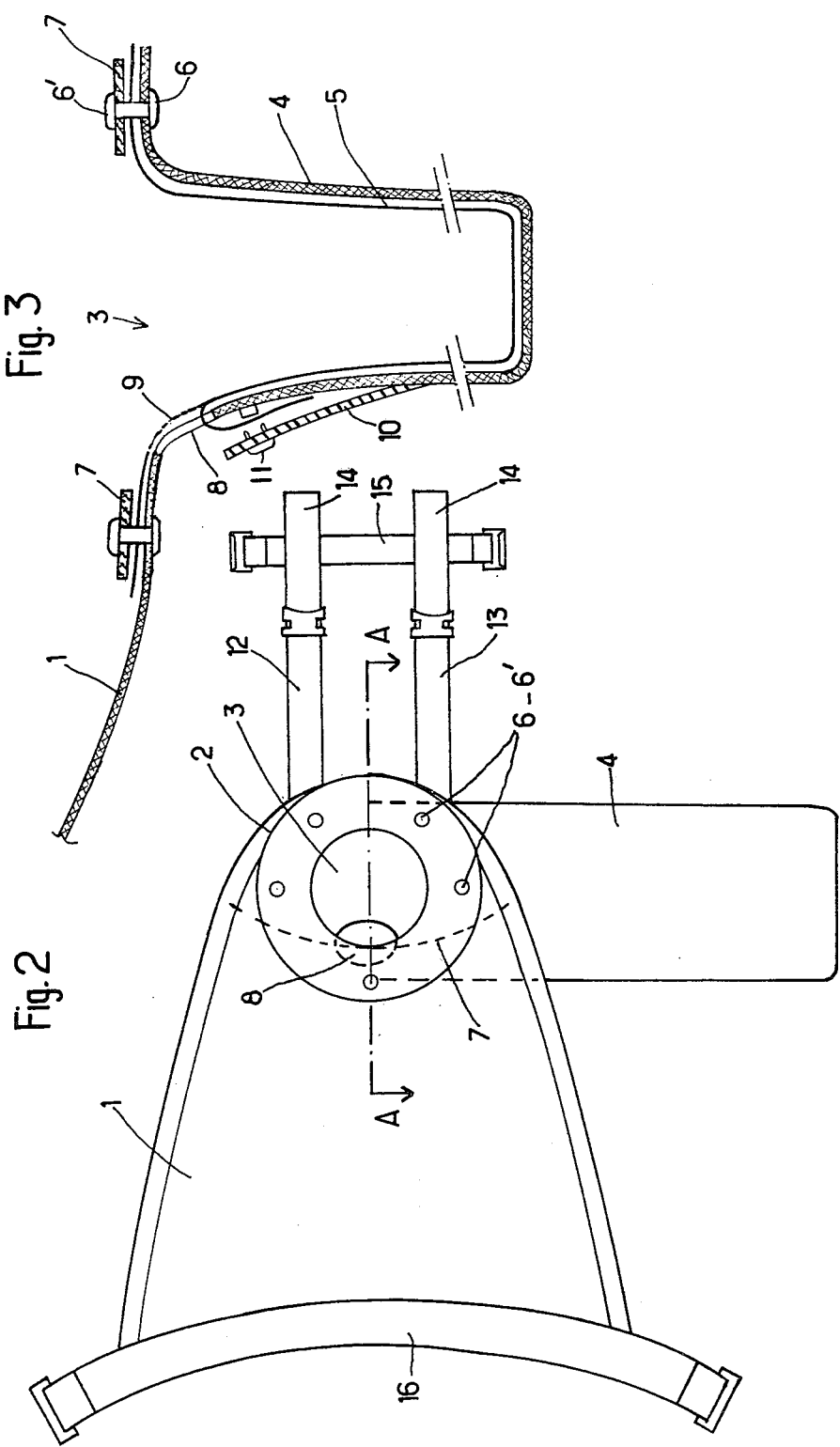

POCKET BREECHES FOR USE BY A DOMESTIC ANIMAL SUCH AS A DOG

The present invention relates to pocket breeches for use by a domestic animal such as a dog It is known that in numerous countries extremely strict rules of hygiene require owners of domestic animals such as dogs to clean the public places (streets, footpaths, parks, etc.) which these animals foul when satisfying their natural needs. The result is, for the owner of the animal, the obligation to provide himself with adequate equipment, when he takes his dog for a walk, and to carry out repeated cleaning of the pavement in order to recuperate the dejections of the animal.

The present invention aims at remedying this disadvantage by equipping the animal with breeches, which, while collecting the droppings of the animal during defecation, in no wise hinders his movements during his walk.

The invention provides then breeches comprising, on the one hand, a back portion made from a material such as a fabric, which covers at least partially the hindquarters and the upper part of the buttocks of the animal and, on the other hand, extending said back portion on one side, a rear part coming back over the posterior of the animal.

This rear part comprises at the level of the anus of the animal, a circular opening from which extends said pockets into which a plastic-material bag may be introduced which is removably fixed to the periphery of said opening.

To allow the tail of the animal to pass through, an aperture is furthermore provided, preferably at the connection between said back portion and said rear part.

At the end of this rear part is connected a belly portion for example made from a fabric or a synthetic material coming under the belly of the animal and which is connected, by its free end, to the front part of the back portion by means of a strap or a resilient belt.

This belly portion has a cut-out of appropriate shape and size for protecting the comfort of the animal and allowing him to urinate without wetting the breeches.

The invention has more particularly as its aim to propose means for readily securing the removable plastic-material bag disposed in the pocket.

It proposes, to this end, disposing in the peripheral edge surrounding said circular opening of the rear part, fixing elements such as snap-fasteners which cooperate with complementary securing elements mounted on a removable piece made for example from a synthetic material provided with a circular opening having a diameter at least equal to the opening of said rear part. The free edge of the bag introduced into the pocket is then sandwiched between the rear part and the removal piece and is nipped during mutual engagement of the fixing elements.

According to another characteristic of the invention, said plastic-material bag comprises a cut-out for letting the tail of the animal pass therethrough. In this case, there may be further provided for improving the securing of the bag a yoke, preferably made from a synthetic material, fixed to the pocket in the vicinity of the opening for passing the tail therethrough, this yoke being provided with at least one element for removably fixing to the pocket such as a snap-fastener designed to pinch, in the closed position, the edge of the bag adjacent the cut-out provided for passing the tail therethrough.

The invention also aims at improving the securing of the breeches to the body of the animal.

To this end, it provides as a variation, instead of the belly portion, two parallel straps of adjustable length, fixed on one side to said rear part, and which are connected, by their front part, to the front part of the back portion by means of a strap of adjustable length. In accordance with another embodiment of the invention, the front ends of the two parallel straps are fixed to a transverse band which hooks onto the two lateral sides of the back portion. The ends of the two parallel straps may furthermore be fitted with buckles (or keepers) through which passes a strap which is fixed with possibility of adjustment to each of the lateral sides of the back portion.

One embodiment of the invention will be described hereafter, by way of non-limiting example, with reference to the accompanying drawings in which:

FIG. 2 is a top view of the breeches disposed upside down and opened out, this view illustrating the method of fixing the bag;

FIG. 3 is a schematical section along A—A of FIG. 2.

Figure 1:
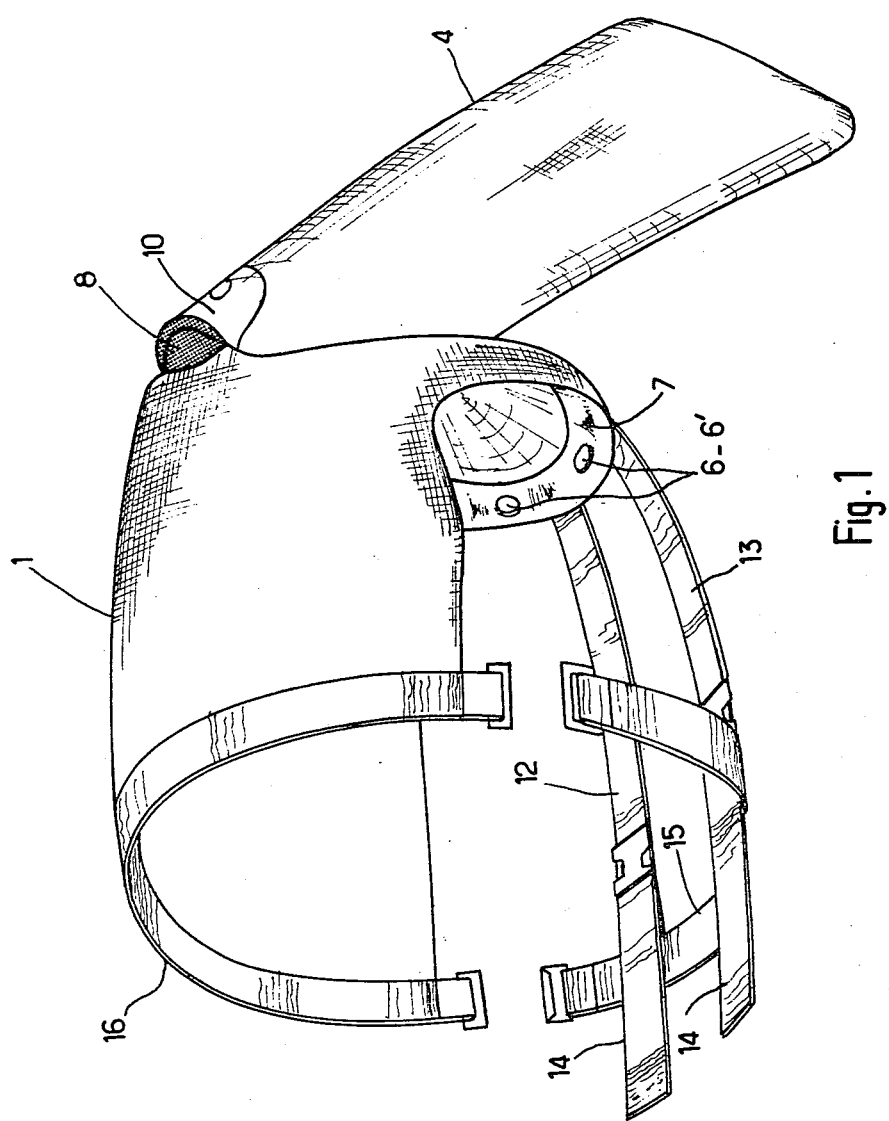
FIG. 1 is a schematical perspective of dog breeches in a position close to the position of use.

With reference to FIGS. 1 and 2, the breeches for dogs comprises first of all a back portion 1, for example made from a fabric, intended to cover at least the hindquarters and the top part of the buttocks of the animal. This back portion is extended by a rear part 2 coming back over the posterior of the animal.

This rear part 2 is provided with a circular opening 3 from which extends a pocket 4 possibly made from the same fabric and which is intended to receive a plastic-material bag 5.

As shown in FIGS. 2 and 3, around this opening 3 are disposed semi-snap-fasteners or similar 6 which cooperate with semi-snap-fasteners 6' mounted on a piece 7, in the form of a ring, preferably made from a synthetic material, and whose internal diameter is at least equal to the diameter of opening 3. This arrangement allows removable fixing of the plastic-material bag 5 whose free edge is disposed between piece 7 and the rear part 2 and is nipped by the snap-fasteners 6, 6'.

At the connection between back portion 1 and rear part 2 is provided an opening 8 for passing the tail of the animal therethrough. Similarly, the plastic-material bag 5 also comprises a corresponding opening 9. Furthermore, for improving the fixing of the bag, the pocket comprises at the level of this opening a yoke 10 forming a pouch, which is provided with a semi-snap-fastener 11 cooperating with a semi-snap-fastener mounted on pocket 4.

The part of the free edge of bag 5 adjacent opening 9 may then be introduced into this pouch and then be nipped therein by snap-fastener 11.

On the free end of the rear part 2 of the breeches are fixed two parallel straps 12, 13 preferably resilient and of adjustable length adjustably fixable to a possibly resilient belly belt 15. This belly belt 15 is adjustably and easily removably fixed to the lateral sides of back portion 1 (in the example shown, at the level of the front edge 16 of back portion 1).

The invention is not limited to the method of connecting the two parallel straps 12, 13 with back portion 1, numerous well-known solutions being able to be used for this purpose.

It will be noted that the interest of such a solution is to allow in particular better adaptation of the breeches of the invention to the anatomy of the animal, whether it is male or female.

I claim:

1. Breeches for use by a domestic animal such as a dog comprising, a back portion (1) covering at least partially the hindquarters and the upper part of the buttocks of the animal and, a rear part (2) coming back over the posterior of the animal and having a circular opening (3) from which extends a pocket (4) into which is introduced a plastic bag (5) which is removably fixed to the periphery of said opening (3), an aperture (8) being furthermore provided for passing the tail of the animal therethrough at the level of the connection between said back portion (1) and said rear part (2); and a belly element connected to the rear part (2) coming under the belly of the animal and which is connected by its free end to the front part of the back portion (1) by means of straps, characterized in that it comprises further in the peripheral edge surrounding said opening (3) of the rear part (2), fixing elements (6) cooperating with complementary fixing elements (6') mounted on a removable piece (7) provided with an opening of a size substantially equal to that of the opening (3) of said rear part (2), so that the free edge of the bag (5) introduced into the pocket (4) is sandwiched between said rear part (2) and said removable piece (7) and is nipped during mutual engagement of said fixing elements (6,6'); said plastic-material bag (5) comprising a cut-out (9) for passing the tail of the animal therethrough and in that, there is provided for improving the securing of the bag a yoke (10) fixed to the pocket (4) in the vicinity of the opening (8) intended for passing the tail therethrough, this yoke (10) being provided with at least one element (11) for removably fixing to the pocket (4), in the closed position, the edge of the bag (5) adjacent the cut-out (9) provided for passing the tail therethrough.

2. Breeches according to claim 1, characterized in that said fixing elements (6,6' and 11) consist of semi-snap-fasteners.

3. Breeches according to claim 1, characterized in that said belly element consists of two parallel straps (12,13) of an adjustable length.

4. Breeches according to claim 3, characterized in that the front ends of the two parallel straps (12, 13) are adjustably fixed to a belly belt adjustably attached to the lateral sides of the back portion (1).

5. Breeches according to claim 4, characterized in that said removable bag (5) and said yoke (10) are made from a synthetic material.

6. Breeches according to claim 3, characterized in that the ends of the two parallel straps (12,13) are provided with buckels (14) through which passes a strap (15) which can be adjusted to each of the lateral sides of the back portion (1).

* * * * *